US012715257B2

(12) United States Patent
Ericksen et al.

(10) Patent No.: US 12,715,257 B2
(45) Date of Patent: Aug. 25, 2026

(54) INTEGRATED ACTIVE VALVE ASSEMBLY

(71) Applicant: Fox Factory, Inc., Braselton, GA (US)

(72) Inventors: Everet Owen Ericksen, Woodland, CA (US); William M. Becker, Aptos, CA (US)

(73) Assignee: Fox Factory, Inc., Duluth, GA (US)

(*) Notice: Subject to any disclaimer, the term of this patent is extended or adjusted under 35 U.S.C. 154(b) by 674 days.

(21) Appl. No.: 17/212,313

(22) Filed: Mar. 25, 2021

(65) Prior Publication Data

US 2021/0300140 A1 Sep. 30, 2021

Related U.S. Application Data

(60) Provisional application No. 63/001,739, filed on Mar. 30, 2020.

(51) Int. Cl.

*B60G 17/018* (2006.01)
*B60G 17/06* (2006.01)
*B62J 43/30* (2020.01)
*B62J 45/20* (2020.01)
*B62J 45/40* (2020.01)
*B62K 21/02* (2006.01)

(52) U.S. Cl.

CPC ........... *B60G 17/018* (2013.01); *B60G 17/06* (2013.01); *B62J 43/30* (2020.02); *B62J 45/20* (2020.02); *B62J 45/40* (2020.02); *B62K 21/02* (2013.01)

(58) Field of Classification Search

CPC ........ B60G 17/018; B60G 17/06; B62J 45/20; B62J 43/30; B62J 45/40; B62K 21/02

See application file for complete search history.

(56) References Cited

U.S. PATENT DOCUMENTS 3,986,118 A 10/1976 Madigan
4,773,671 A 9/1988 Inagaki
4,984,819 A 1/1991 Kakizaki et al.
5,027,303 A 6/1991 Witte
5,105,918 A 4/1992 Hagiwara et al.
5,390,949 A 2/1995 Naganathan et al.
5,952,823 A 9/1999 Sprecher et al.
6,026,939 A 2/2000 Girvin et al.
6,244,398 B1 6/2001 Girvin et al.
6,427,812 B2 8/2002 Crawley et al.
6,863,291 B2 3/2005 Miyoshi
6,935,157 B2 8/2005 Miller
7,374,028 B2 5/2008 Fox
8,627,932 B2 1/2014 Marking
8,857,580 B2 10/2014 Marking (Continued)

OTHER PUBLICATIONS

European Search Report for European Application No. 21165379.5 , 8 pages, Sep. 21, 2021 (Sep. 21, 2021)).

(Continued)

*Primary Examiner* — Valentin Neacsu
*Assistant Examiner* — Michael R Stabley

(57) ABSTRACT

An integrated active valve assembly is disclosed. The integrated active valve assembly including a suspension controller module, an active shock assembly, and a wire to communicatively couple the suspension controller module with the active shock assembly such that the suspension controller module can send a signal via the wire to modify a damping characteristic of the active shock assembly.

14 Claims, 10 Drawing Sheets

(56) References Cited

U.S. PATENT DOCUMENTS

| | | | | |
|---|---|---|---|---|
| 9,033,122 | B2 | 5/2015 | Ericksen et al. | |
| 9,120,362 | B2 | 9/2015 | Marking | |
| 9,239,090 | B2 | 1/2016 | Marking et al. | |
| 9,353,818 | B2 | 5/2016 | Marking | |
| 10,072,724 | B2 * | 9/2018 | Haugen | F16F 9/18 |
| 2016/0339989 | A1 | 11/2016 | Walthert et al. | |
| 2018/0010666 | A1 | 1/2018 | Marking | |

OTHER PUBLICATIONS

Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.

European Examination Report for EP Application No. 21165379.5, 7 pages, Mailed Dec. 23, 2024.

* cited by examiner 775
775
775
766
765
765
765
751
755
755
755
753
752

770
725
726
720
704
707
710
721
450
702
717
708
712
706
715
719
705
703

INTEGRATED ACTIVE VALVE ASSEMBLY

CROSS-REFERENCE TO RELATED APPLICATIONS (PROVISIONAL)

This application claims priority to and benefit of U.S. Provisional Patent Application No. 63/001,739 filed on Mar. 30, 2020, entitled "INTEGRATED ACTIVE VALVE ASSEMBLY" by Ericksen et al., and assigned to the assignee of the present application, the disclosure of which is hereby incorporated by reference in its entirety.

FIELD OF THE INVENTION

Embodiments of the present technology relate generally an active valve shock assembly.

BACKGROUND

Vehicle suspension systems typically include one or more shock assemblies. In general, a shock assembly includes a spring component or components and a damping component or components that work in conjunction to provide for a comfortable ride, enhance performance of a vehicle, and the like. In general, some or all of the shock assemblies will include a number of different settings, configurations, and the like. As such, a suspension setup (or tune) is always a collection of compromises to achieve performance objectives over a range of different possible encounters. However, as with every collection of compromises, an advancement in one area almost always incurs a new problem or set of problems that require further advancement, analysis, and invention.

BRIEF DESCRIPTION OF THE DRAWINGS

Aspects of the present invention are illustrated by way of example, and not by way of limitation, in the accompanying drawings, wherein.

Figure 1A:
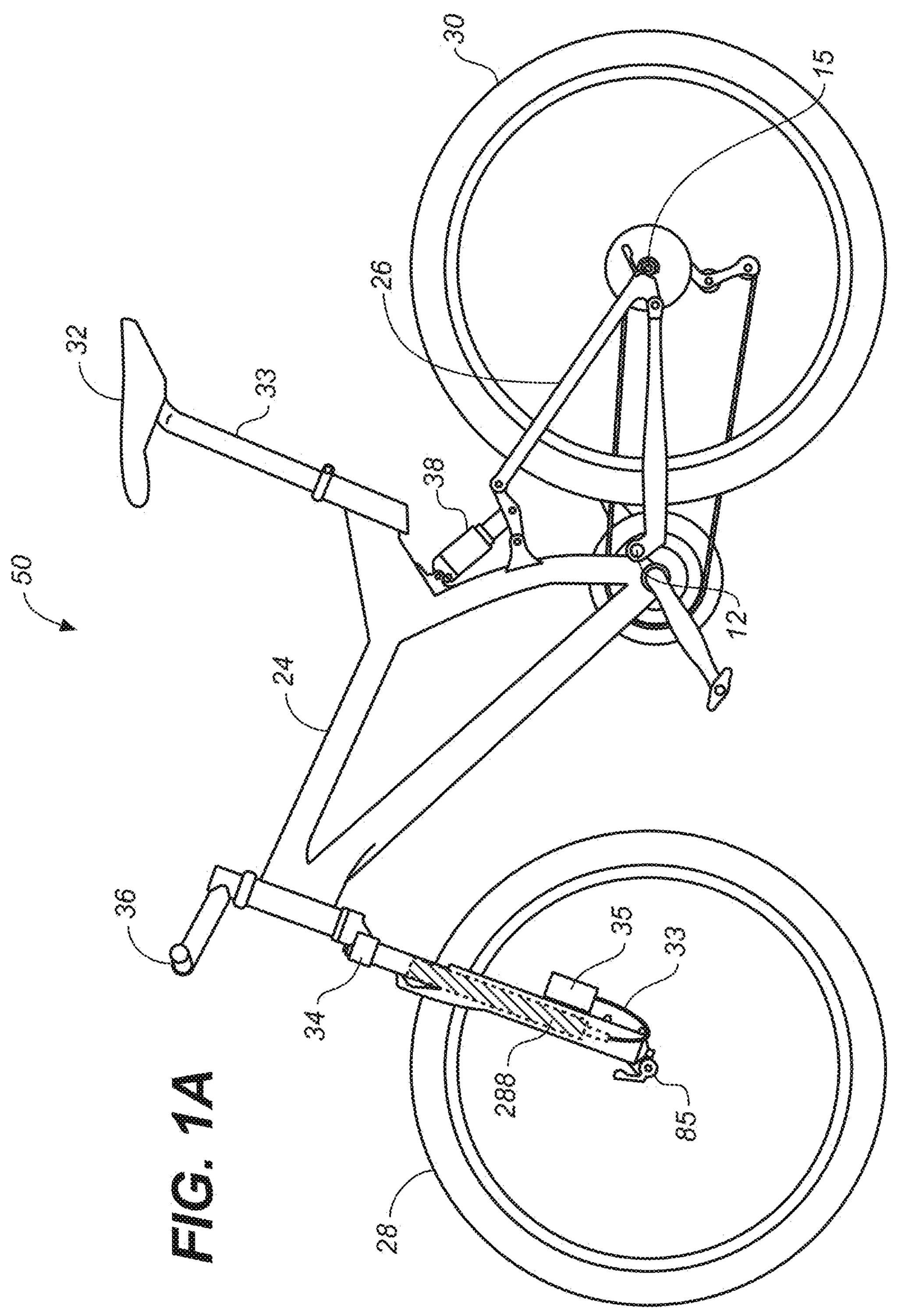
FIG. 1A is a perspective view of a bicycle having an active valve assembly integrated with a fork, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

In the following discussion, the term "active", as used when referring to a valve or shock assembly component, means adjustable, manipulatable, etc., during typical operation of the valve. For example, an active valve can have its operation changed to thereby alter a corresponding shock assembly damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding shock assembly damping characteristics, based upon, for example, operational information pertaining to the vehicle and/or the suspension with which the valve is used. Similarly, it will be understood that in some embodiments, an active valve may be configured to automatically adjust its operation, and corresponding shock assembly damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or shock assembly component means manually adjustable, physically manipulatable, etc., without requiring disassembly of the valve, damping component, or shock assembly which includes the valve or damping component. In some instances, the manual adjustment or physical manipulation of the valve, damping component, or shock assembly, which includes the valve or damping component, occurs when the valve is in use. For example, a manual valve may be adjusted to change its operation to alter a corresponding shock assembly damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension").

In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

Embodiments provide an integrated active valve assembly that is mounted to a vehicle to deliver a stand-alone active valve control assembly. In one embodiment, the controller, battery, and sensor are integrated into one control module that mounts to the fork lower for terrain sensing and there are no external sensors or battery needed for the assembly to perform the function of a bicycle active valve control. Everything is contained in one module that mounts to the unsprung mass of the fork.

In one embodiment, the fork damping cartridge of the shock assembly is inverted such that the active valve (e.g., an active solenoid) is attached to the fork lower and the rebound adjuster is attached to the fork upper. Because both the controller and the active solenoid are attached to the fork lower, the connecting wire is static and doesn't move when the fork is compressed, the handlebars are turned, etc. In one embodiment, the wire can be entirely hidden inside the fork. In so doing, embodiments provide a stand-alone active valve control assembly with increased durability and aesthetics.

In one embodiment, the controller, battery, and sensor are integrated into one module that mounts to an unsprung mass of a suspension component of a vehicle, e.g., a static portion of the front fork assembly that is directly coupled to the axle of the front wheel. In one embodiment, a plurality of integrated control modules could be used on a vehicle. For example, a bicycle can have an integrated control module at the front suspension and another integrated control module at the rear suspension.

In the following discussion, and for purposes of clarity, a bicycle is utilized as the example vehicle showing the active valve assembly integration. However, in another embodiment, the active valve assembly integration could be used on a suspension of any one of a variety of vehicles such as, but not limited to, a bicycle, an electric bike (e-bike), a motorcycle, a watercraft, a snow machine, a 3-4 wheeled vehicle, a multi-wheeled vehicle, or the like.

Referring now to FIG. 1A, a perspective view of a bicycle 50 having an active valve assembly integrated with a front fork assembly 34 is shown in accordance with an embodiment. In one embodiment, bicycle 50 has a main frame 24 with a suspension system comprising a swing arm 26 that, in use, is able to move relative to the rest of main frame 24; this movement is permitted by, inter alia, rear shock assembly 38. The front fork assembly 34 also provide a suspension function via a shock assembly in at least one fork leg. In one embodiment, at least one valve in the shock assembly is an active valve (such as active valve 450 discussed herein). For purposes of clarity, in the following discussion the shock assembly with at least one active valve is referred to hereinafter as active shock assembly 288.

In one embodiment, bicycle 50 is a full suspension bicycle. In another embodiment, bicycle 50 has only a front suspension and no rear suspension (e.g., a hard tail). In different embodiments, bicycle 50 could be a road bike, a mountain bike, a gravel bike, an electric bike (e-bike), a hybrid bike, a motorcycle, or the like.

However, the embodiments described herein are not limited to use on full suspension bicycles. In particular, the term "suspension system" is intended to include vehicles having front suspension only, rear suspension only, seat suspension only, a combination of two or more different suspension types, and the like.

In one embodiment, swing arm 26 is pivotally attached to the main frame 24 at pivot point 12. Although pivot point 12 is shown in a specific location, it should be appreciated that pivot point 12 can be found at a different location depending upon the rear suspension configuration. The use of the pivot point 12 herein is provided merely for purposes of clarity.

For example, in a hardtail bicycle embodiment, there would be no pivot point 12. In one embodiment of a hardtail bicycle, main frame 24 and swing arm 26 would be formed as a fixed frame.

Bicycle 50 includes a front wheel 28 which is coupled with the front fork assembly 34 via axle 85. In one embodiment, a portion of front fork assembly 34 (e.g., a steerer tube) passes through the bicycle main frame 24 and couples with handlebar assembly 36. In so doing, the front fork assembly and handlebars are rotationally coupled with the main frame 24 thereby allowing the rider to steer the bicycle 50.

Bicycle 50 includes a rear wheel 30 which is coupled to the swing arm 26 at rear axle 15, and rear shock assembly 38 positioned between the swing arm 26 and the frame 22 to provide resistance to the pivoting motion of the swing arm 26 about pivot point 12. In one embodiment, a saddle 32 is connected to the main frame 24 via a seatpost 93. In one embodiment, seatpost 93 is a dropper seatpost. In one embodiment, active shock assembly 288, rear shock assembly 38, seatpost 93, handlebar assembly 36, and/or the like include one or more active damping components such as, or similar to, the active valve 450 as discussed herein.

Figure 1B:
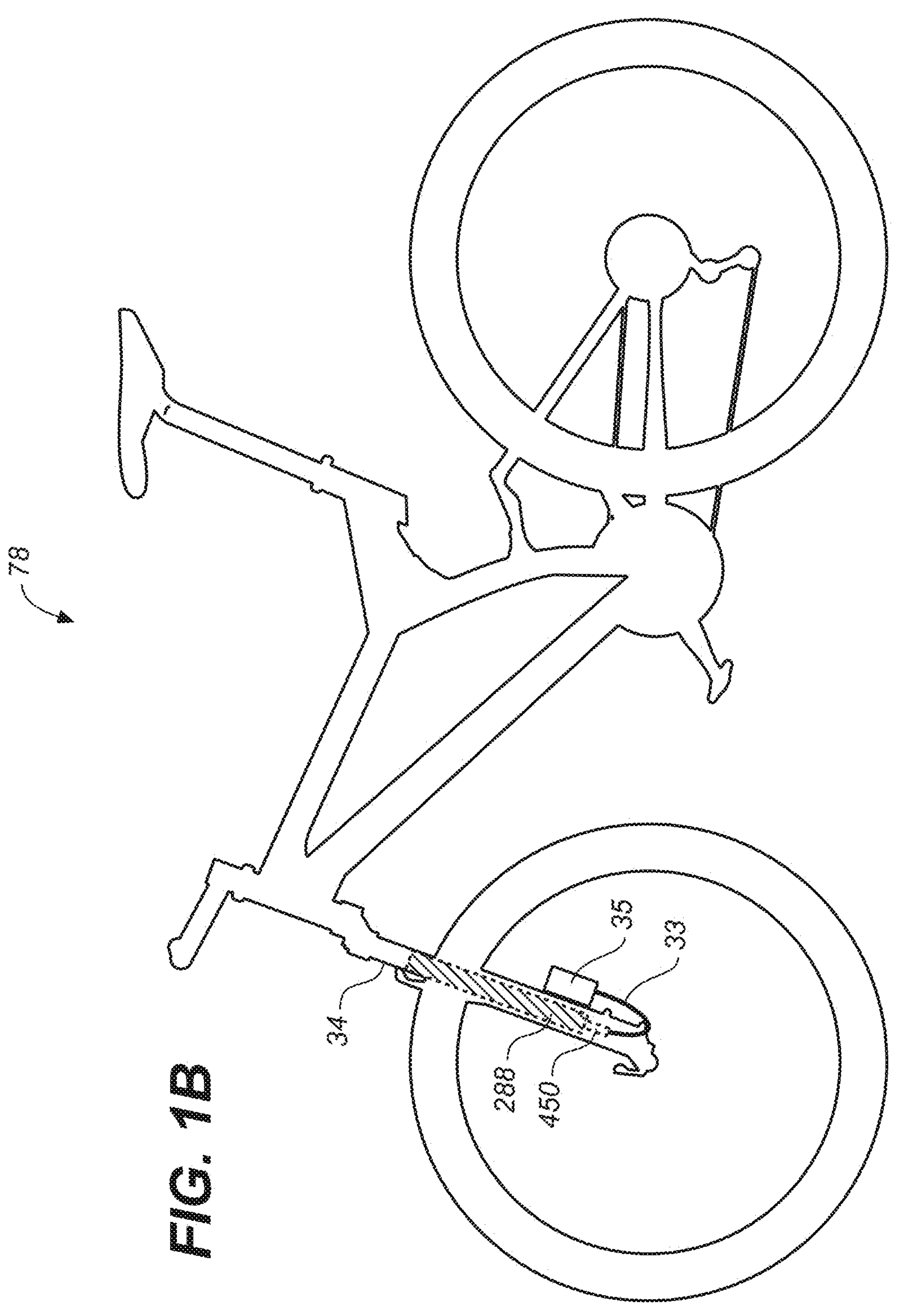
FIG. 1B is a side view of a bicycle with focus on an integrated active valve assembly, in accordance with an embodiment.

Referring now to FIG. 1B, a side view of the bicycle 50 of FIG. 1A with an integrated active valve assembly 78 is shown in accordance with an embodiment. In one embodiment, integrated active valve assembly 78 includes a suspension controller module 35 consisting of one or more sensor(s) and batteries, active shock assembly 288 including at least one active valve 450, and a wire 33 connecting the suspension controller module 35 with the active shock assembly 288. In one embodiment, integrated active valve assembly 78 is positioned at the lower fork tube 201 of front fork assembly 34.

In one embodiment, active shock assembly 288 includes an inverted fork damping cartridge such that the active valve 450 is attached to the front fork assembly 34 lower and the rebound adjuster is attached to the front fork assembly 34 upper. In one embodiment, since both the suspension controller module 35 and the active shock assembly 288 are attached to the front fork assembly 34 lower, the connecting wire 33 is static. In other words, the relative locations of the suspension controller module 35 and the active shock assembly 288 will remain unchanged when the front fork assembly 34 is compressed, when the handlebars are turned, and the like.

In one embodiment, wire 33 is run externally along a portion of the front fork assembly 34 from the suspension controller module 35 to the active shock assembly 288. In one embodiment, a hole is formed in the fork leg, and the wire 33 is run internally from the suspension controller module 35 to the active shock assembly 288. In one embodiment, the hole is formed in the fork leg such that the mounting of suspension controller module 35 on the fork leg will cover the hole. In so doing, wire 33 can be entirely hidden inside the front fork assembly 34 which provides an added level of aesthetics and durability.

In one embodiment, suspension controller module 35 is a self-contained module that includes a housing with a suspension controller, a battery, and a sensor (e.g., an accelerometer) integrated therein. In one embodiment, suspension controller module 35 mounts to the lower fork tube 201 (shown in detail in FIGS. 2A and 2B) for terrain sensing and providing adjustments to active shock assembly 288. Thus, in one embodiment, suspension controller module 35 is self-contained and does not require any external sensors or power source for the suspension controller module 35 to perform the function of the integrated active valve assembly 78. In other words, everything is contained in one control module (e.g., suspension controller module 35) that mounts to the unsprung mass of the front fork assembly 34.

In the following discussion, the sensor(s) within suspension controller module 35 could be a single sensor (such as an accelerometer) or a combination of sensors. In general, the sensor(s) is used for sensing one or more characteristics (or changes to characteristics) such as terrain, environment, temperature, vehicle speed, vehicle pitch, vehicle roll, vehicle yaw, or the like.

For example, the sensor may be any suitable force or acceleration transducer (e.g. strain gage, Wheatstone bridge, accelerometer, hydraulic, interferometer based, optical, thermal or any suitable combination thereof). Further, the sensor may utilize solid state electronics, electro-mechanical principles or MEMS, or any other suitable mechanisms. In one embodiment, the sensor comprises a single axis self-powered accelerometer, such as for example ENDEVCO® model 2229C. The 2229C is a comparatively small device with overall dimensions of approximately 15 mm height by 10 mm diameter, and weighs 4.9 g. Its power is self-generated and therefore the total power requirements for the bicycle 50 are reduced; this is an important advantage, at least for some types of bicycle, where overall weight is a concern. An alternative single axis accelerometer is the ENDEVCO® 12MIA, which is of the surface-mount type. The 12MIA is a single axis accelerometer comprising a bimorph sending element which operates in the bender mode. This accelerometer is particularly small and light, measuring about 4.5 mm by 3.8 mm by 0.85 mm, and weighs 0.12 g. In one embodiment, the sensor may be a triaxial accelerometer such as the ENDEVCO® 67-100. This device has overall dimensions of about 23 mm length and 15 mm width, and weighs 14 g.

In one embodiment, suspension controller module 35 is fixed to an unsprung portion of front fork assembly 34. In general, suspension controller module 35 may be integrated with the vehicle structure and data processing system as described in U.S. Pat. Nos. 6,863,291; 4,773,671; 4,984,819; 5,390,949; 5,105,918; 6,427,812; 6,244,398; 5,027,303 and 6,935,157; each of which is herein incorporated, in its entirety, by reference. Suspension controller module 35 and active shock assembly 288 including at least one active valve 450 (e.g. electric solenoid or linear motor type-note that a rotary motor may also be used with a rotary actuated valve) may be integrated herein utilizing principles outlined in SP-861-Vehicle Dynamics and Electronic Controlled Suspensions SAE Technical Paper Series no. 910661 by Shiozaki et. al. for the International Congress and Exposition, Detroit, Mich., Feb. 25-Mar. 1, 1991 which paper is incorporated herein, in its entirety, by reference. Further, suspension controller module 35 consisting of one or more sensor(s) and active shock assembly 288 including at least one active valve 450, or principles, of patents and other documents incorporated herein by reference, may be integrated one or more embodiments hereof, individually or in combination, as disclosed herein.

In one embodiment, suspension controller module 35 includes a power source such as a lithium-ion battery or the like. In one embodiment, the power source for suspension controller module 35 is charged wired or wirelessly while either on or off the bicycle.

In one embodiment, data obtained by the one or more sensor(s) are reviewed by suspension controller module 35 at a rate, such as for example, 1,000 times per second (or another rate) and make suspension adjustments in a matter of milliseconds. In so doing, the suspension controller module 35 can continually processes the sensor data and constantly provide adjustments to active valve 450 of active shock assembly 288 thereby adjusting the suspension stiffness of active shock assembly 288 for maximum efficiency and control.

For example, in one embodiment, suspension controller module 35 will read bump input at the wheel, the pitch angle of the bicycle 50, telemetry attributes such as angle, orientation, velocity, acceleration, RPM, operating temperature, and the like. The suspension controller module 35 will use the sensor data to generate suspension adjustments for active shock assembly 288 via one or more of the active valves (e.g., active valve 450). For example, the active shock assembly 288 of front fork assembly 34 will receive a signal from suspension controller module 35 to adjust one or more flow paths to modify the damping characteristics of the active shock assembly 288.

In one embodiment, suspension controller module 35 can also communicate wired or wirelessly with other devices such as another controller, a mobile device, a computing system, and/or any other smart component(s) within a transmission range of suspension controller module 35. For example, in one embodiment, suspension controller module 35 can communicate with other computing devices wired or wirelessly via systems such as near field communication (NFC), WAN, LAN, Bluetooth, WiFi, ANT, GARMIN® low power usage protocol, or any suitable power or signal transmitting mechanism.

Figure 1C:
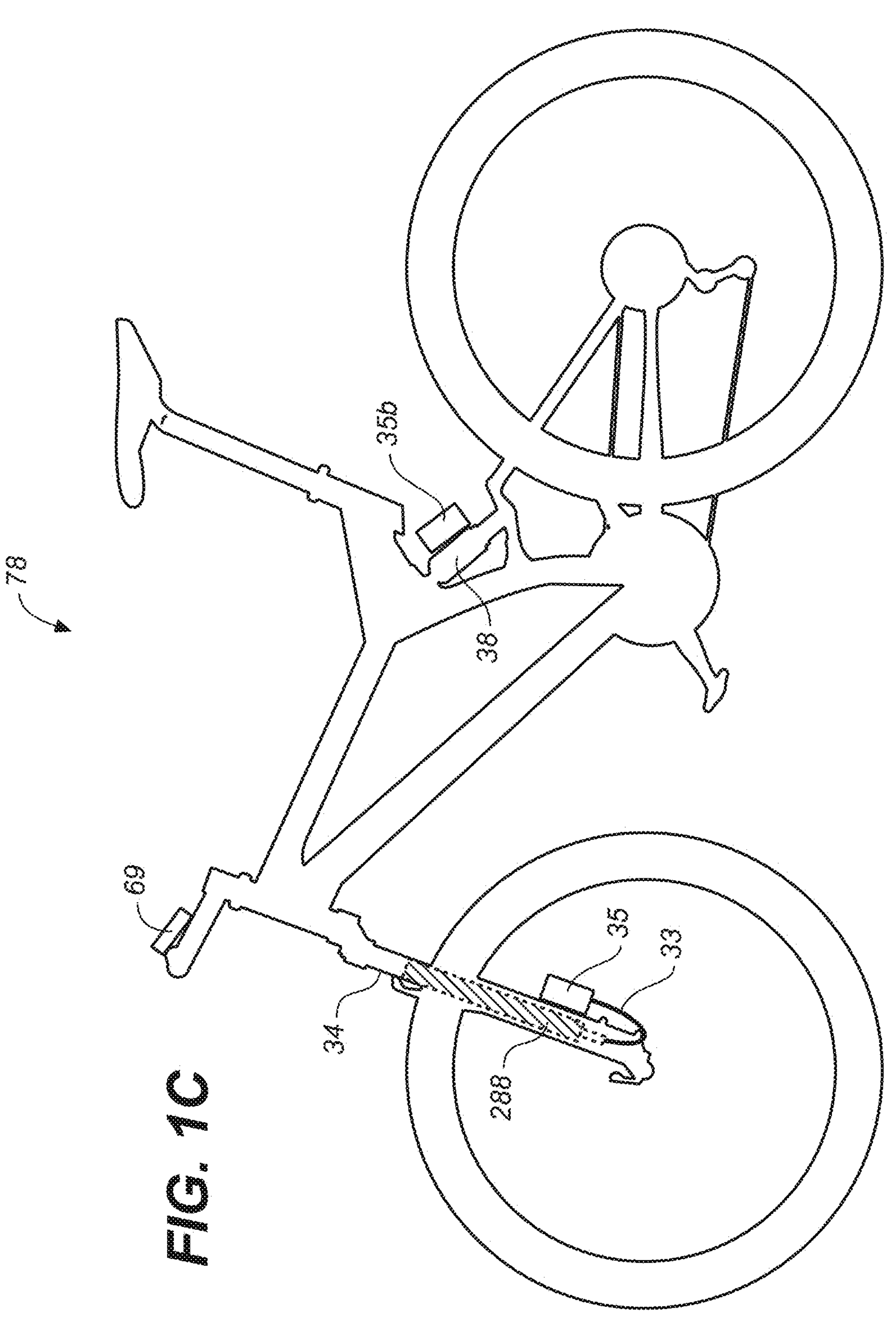
FIG. 1C is a side view of a bicycle with focus on the integrated active valve assembly and the additional components of a wireless switch, and a rear suspension controller.

Referring now to FIG. 1C, a version of the bicycle of FIG. 1B is shown with the additional components of a wireless switch 69, and a rear suspension controller module 35*b*.

In one embodiment, suspension controller module 35 connectivity allows suspension controller module 35 to communicate with other controllers. In one embodiment, the communication could be with wireless switch 69, rear suspension controller module 35*b*, a controller on a second vehicle, or any number of controllers on any number of vehicles. In one embodiment, the connected network would allow components to provide information to suspension controller module 35 or vice-versa.

For example, by utilizing wireless connectivity, suspension controller module 35 can be in communication with wireless switch 69, rear suspension controller module 35*b* and/or other controllers. For example, if suspension controller module 35 is in wireless communication with rear suspension controller module 35*b*, information from suspension controller module 35 at the front of the bike could be provided to rear suspension controller module 35*b*. In so doing, the information from the forward suspension controller module 35 can be used to provide the rear suspension controller module 35*b* with future-time information. In other words, the rear suspension controller module 35*b* will receive the information provided from the forward suspension controller module 35 a short time prior to the rear wheel reaching the location of the front wheel and encountering what the front wheel suspension had already encountered. This would allow rear suspension controller module 35*b* to provide an active valve adjustment to the rear shock assembly 38 prior to the rear end encountering the upcoming terrain or suspension event.

In one embodiment, wireless switch 69 is mounted inboard of the hand grip on handlebar assembly 36. In one embodiment, wireless switch 69 is mounted to main frame 24 or any location on the vehicle based on a rider preference. In one embodiment, wireless switch 69 has a number of switch positions.

For example, in one embodiment, wireless switch 69 has three positions allowing the selection of three different modes. The modes could be open, auto, and lock out (different levels of bump sensing, or some combination thereof). The lock out mode would be a "sprint" type setting that would lock-out the suspension, providing no bump sensing and removing the opportunity for pedal bob.

In an open mode embodiment, the suspension would be a softer suspension that does not use any (or uses only limited bump sensing for the most major of suspension events). In the auto mode, the suspension controller module 35 and/or rear suspension controller module 35*b* would operate in the "best" configuration. Such a "best" configuration could be based on terrain, rider, riding style, bike type, ride length, ride purpose, etc. For example, a "best" mode for a downhill mountain bike race would be a very active suspension configuration with a large range of motion, a "best" mode for a street race would be a firm suspension configuration with a very small range of motion, a "best" mode for a Sunday afternoon street ride would be a soft suspension configuration, etc.

Although three switch positions are discussed, wireless switch 69 could be a simple on/off switch to either activate or deactivate one or both of suspension controller module 35 and rear suspension controller module 35*b*. In another embodiment, wireless switch 69 could have any different number of switches, options, menus, and the like.

In one embodiment, wireless switch 69 could be an app on a mobile device or other smart device (e.g., GPS, etc.). In one embodiment, the mobile device containing the wireless switch app (or capability) is removably mounted on the bike via a mounting stand or the like.

In one embodiment, wireless switch 69 could be an app on a rider's smart watch (or other jewelry) that is worn by the rider instead of being mounted on the bike, etc.

In one embodiment, the wireless communication could be between suspension controller module 35 and a suspension controller on a second vehicle, or any number of suspension controllers on any number of vehicles. For example, if two riders are riding two bikes within a communication range of the suspension controllers, one or more suspension controllers on each of the bicycles could be communicating wirelessly such that the suspension information from the lead bike is also provided to the follow bicycle(s) (or automobiles, motorcycles, ATVs, snowmobiles, water vehicles, and the like). In so doing, the suspension information from the lead vehicle can be used as future suspension information to the follow vehicle(s). In other words, the front vehicle information is provided to the follow vehicle(s) a short time prior to the follow vehicle(s) actually reaching the location of the suspension event (or terrain, etc.) that the front vehicle has already encountered. This would allow a suspension controller module 35 on a follow vehicle to use the active valve adjustment to prepare the active shock assembly 288 (and/or rear suspension controller module 35*b* to prepare rear suspension assembly 38) for the upcoming terrain or event.

In one embodiment, the sensor data is stored in a storage component of suspension controller module 35 such that the sensor information can be accessed, reviewed, evaluated, and the like. For example, the sensor data and suspension controller module 35 responses to the sensor data could be reviewed when the data from suspension controller module 35 is downloaded to a computer system. The review could include evaluations and outcomes to determine if any modifications or changes should be made to the suspension controller module 35 operations. In one embodiment, if any modifications or changes are identified, they can be uploaded to suspension controller module 35 from the computer system.

Although, in one embodiment, the integrated active valve assembly 78 is integrated with the front fork assembly 34 in context of a bicycle, it should be appreciated that the integrated active valve assembly 78 could be used in different suspension setups and in different vehicles such as, but not limited to a bicycle, motorcycle, ATV, jet ski, car, etc. Moreover, although a number of components are shown in the disclosed figures, it should be appreciated that one or more of the components of the integrated active valve assembly 78 could be adjusted, modified, removed, added, or exchanged for personal reasons, performance reasons, different applications (e.g., road, downhill, offroad, uphill, etc.), different vehicles, and the like.

Figure 2A:
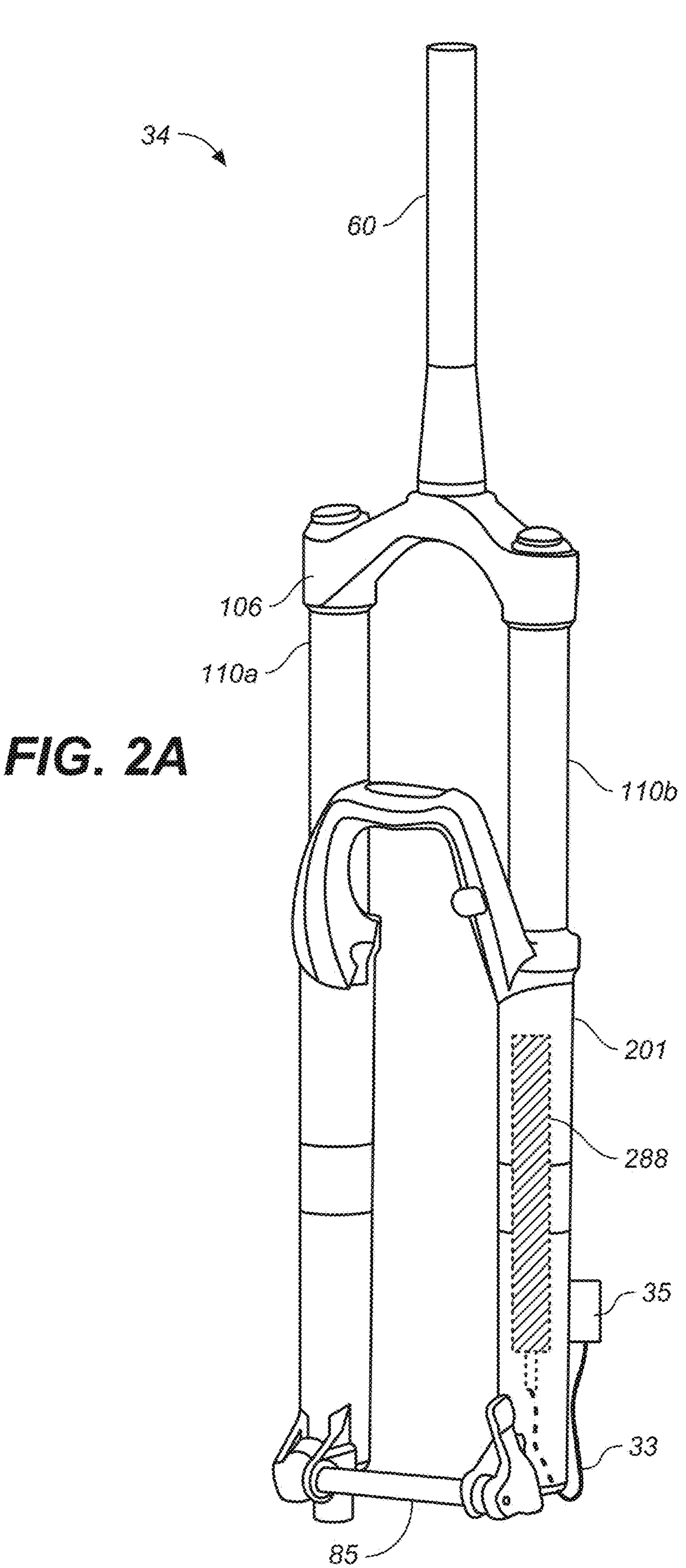
FIG. 2A is a perspective view of a fork assembly including the integrated active valve assembly, in accordance with an embodiment.

Referring now to FIG. 2A, a perspective view of a front fork assembly 34 that includes the integrated active valve assembly 78 is shown in accordance with an embodiment. In one embodiment, front fork assembly 34 includes a crown 106, fork leg 110*a*, and fork leg 110*b*, and an axle 85. In one embodiment, axle 185 passes through the center of front wheel 28 and, as such, defines the point about which front wheel 28 rotates. In a duel legged fork setup, axle 85 is removably coupled to fork leg 110*a* and fork leg 110*b*, thereby coupling the front wheel to the front fork assembly 34. In a single legged fork setup, axle 85 is removably coupled to the single fork leg, thereby coupling the front wheel to the front fork assembly 34. Front fork assembly 34 also illustrates an active valve assembly integrated with front fork assembly 34. In one embodiment, the integrated active valve assembly 78 includes active shock assembly 288 including at least one active valve 450, suspension controller module 35, and wire 33 connecting the active shock assembly 288 to the suspension controller module 35.

Figure 3A:
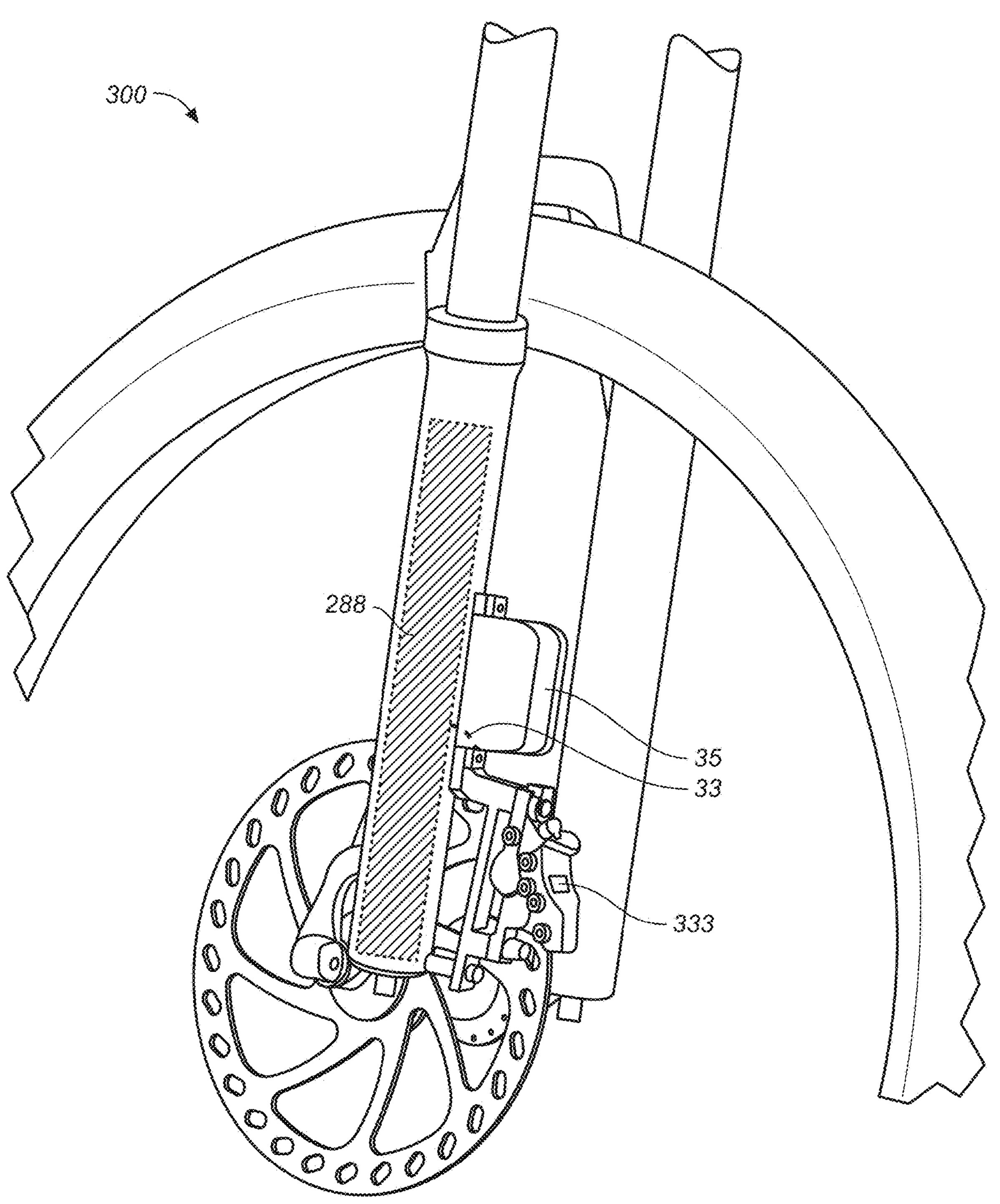
FIG. 3A is a side view of a front portion of a bicycle with an integrated active valve assembly on the same fork leg as a disk brake caliper, in accordance with an embodiment.
Figure 3B:
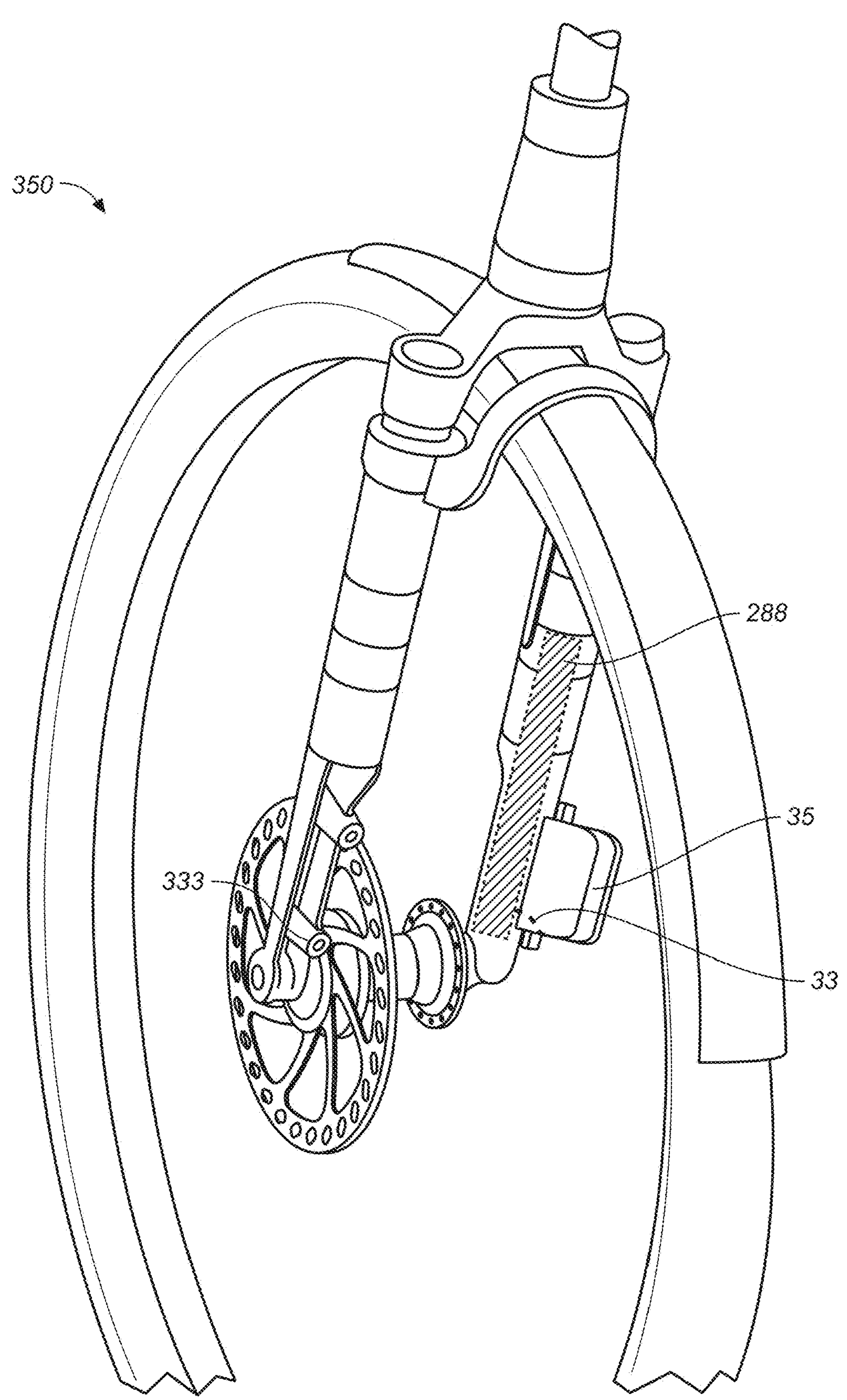
FIG. 3B is a side view of a front portion of a bicycle with an integrated active valve assembly on a different fork leg than the disk brake caliper, in accordance with an embodiment.

In one embodiment, wire 33 could be directly provided through the fork assembly such that no wire 33 is actually showing between the suspension controller module 35 and the active shock assembly 288. Examples of the hidden wire 33 are shown in FIGS. 3A and 3B.

Although FIG. 2A shows front fork assembly 34 with two fork legs (e.g., fork leg 110*a* and fork leg 110*b*), in one embodiment, there may only be a single fork. In one embodiment, the components of front fork assembly 34 are fixedly coupled during the assembly process. In one embodiment, one, some, or all of the components of front fork assembly 34 could be metal, composite, 3D printed, or the like.

In one embodiment, the integrated active valve assembly 78 and front fork assembly 34 of FIG. 2A could be built and sold as a single fork assembly upgrade. For example, the rider could replace an existing fork assembly on a bicycle with the integrated active control fork assembly of FIG. 2A. In so doing, the rider would be able to upgrade her legacy bicycle to a bicycle with an active front suspension merely by installing the integrated active control fork assembly.

Figure 2B:
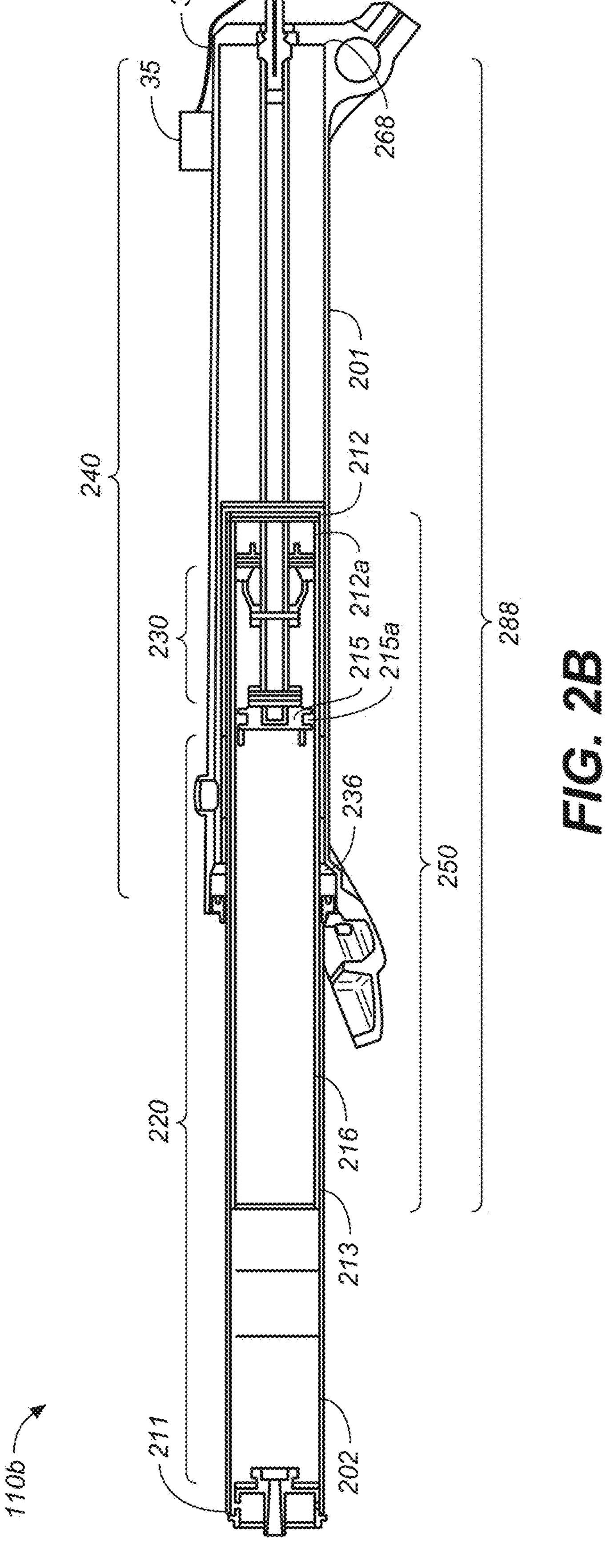
FIG. 2B is a cross-sectional view of a fork leg with the integrated valve assembly, in accordance with an embodiment.

Referring now to FIG. 2B, a cross-sectional view of an example of a fork leg 110*b* is shown in accordance with an embodiment. In one embodiment, fork leg 110*b* includes a top cap 211, an upper fork tube 202, a lower fork tube 201, and active shock assembly 288 disposed therein. Although a number of features are shown in fork leg 110*b*, it should be appreciated that there may be more of fewer components or the components may be arranged differently. For example, in an inverted fork leg design, the lower fork tube 201 could be telescopically coupled within upper fork tube 202. Although a number of features are shown in active shock assembly 288, it should be appreciated that in one embodiment of active shock assembly 288, more, fewer, or different components may also be utilized. Further, other damping assemblies could be used as a shock assembly in one or more fork legs of front fork assembly 34.

In one embodiment, active shock assembly 288 incudes a partial cartridge tube 216, a partial cartridge tube gas seal 213, a movable piston 215 with a piston gas seal 215*a*, a base 212 with a base gas seal 212*a*, a positive damper volume 220, a negative damper volume 230, a bottom 268, a lower leg gas volume 240, and an annular gas volume 250. In one embodiment, one or more of the valves in active shock assembly 288 are active valves such as active valve 450.

In one embodiment, the positive damper volume 220 is at the top of the active shock assembly 288 and includes the area from the top cap 211 (or to the top of partial cartridge tube 216) and within partial cartridge tube 216 to piston gas seal 215*a* on movable piston 215. The negative damper volume 230 includes the space below piston gas seal 215*a* on movable piston 215 down toward base gas seal 212*a* on the base 212 within partial cartridge tube 216. The lower leg gas volume 240 is defined as the space from the gas seal 236 to atmosphere at the top of lower fork tube 201, about the exterior of upper fork tube 202, to the bottom 268 of the active shock assembly 288.

In one embodiment, the positive damper volume 220 is the volume that is reduced as the movable piston 215 is driven upward during a compression of the fork. Thus, as fork leg 110*b* compresses, the positive damper volume 220 decreases. The negative damper volume 230 is the volume that is increased as the movable piston 215 is driven upward during a compression of the fork leg 110*b*. Thus, as the fork leg 110*b* compresses, the negative damper volume 230 increases. In one embodiment, the positive damper volume 220 and the negative damper volume 230 communicate at one or more position(s)/stroke(s) through an internal bypass channel.

In one embodiment, partial cartridge tube 216 can be an integral part of the fork leg 110*b* or it can be a removably coupleable part that is axially added to the internals of fork leg 110*b*. For example, the active shock assembly 288 could have a main piston seal on the inner diameter of fork leg 110*b*. In another embodiment, a cartridge shock assembly is used. In general, a cartridge damper is completely separable from the fork leg 110*b*. In other words, it can be removed from fork leg 110*b* and it would still be a shock assembly. In general, the cartridge shock assembly is coaxial and is a cartridge that threads into the fork leg.

In one embodiment, active shock assembly 288 is filled with air. However, in another embodiment, active shock assembly 288 could be filled with many different types of fluid, instead of air. The fluid could be one of an assortment of gasses (such as regular air, nitrogen, helium, carbon dioxide, and the like.) Similarly, the fluid could be a liquid.

Referring now to FIG. 3A, a side view 300 of a front portion of a bicycle with an integrated active valve assembly 78 on the same fork leg as a front disk brake caliper is shown in accordance with an embodiment. In one embodiment, integrated active valve assembly 78 includes suspension controller module 35 communicatively coupled with the active shock assembly 288 where the wire 33 is internally routed via a hole in the fork leg to communicatively couple the suspension controller module 35 with active shock assembly 288.

Although an embodiment of a mounting configuration for the components of integrated active valve assembly 78 is shown, it should be appreciated that in another embodiment, one or more components of the integrated active valve assembly 78 including the suspension controller module 35, the wire 33 and or active shock assembly 288 could be mounted in different directions, at different orientations, and/or at different locations on either of the fork arms. In one embodiment, the bicycle in side view 300 is an example of a mountain bike.

Referring now to FIG. 3B, a side view 350 of a rear portion of a bicycle having an integrated active valve assembly 78 on the fork leg without the front disk brake caliper 333 is shown in accordance with an embodiment. In one embodiment, integrated active valve assembly 78 includes suspension controller module 35 communicatively coupled with the active shock assembly 288 where the wire 33 is internally routed via a hole in the fork leg to communicatively couple the suspension controller module 35 with active shock assembly 288.

Although an embodiment of a mounting configuration for the components of integrated active valve assembly 78 is shown, it should be appreciated that in another embodiment, one or more components of the integrated active valve assembly 78 including the suspension controller module 35, the wire 33 and or active shock assembly 288 could be mounted in different directions, at different orientations, and/or at different locations on either of the fork arms. In one embodiment, the bicycle in side view 350 is a gravel bike, road bike, or the like.

Example Active Valve

Figure 4:
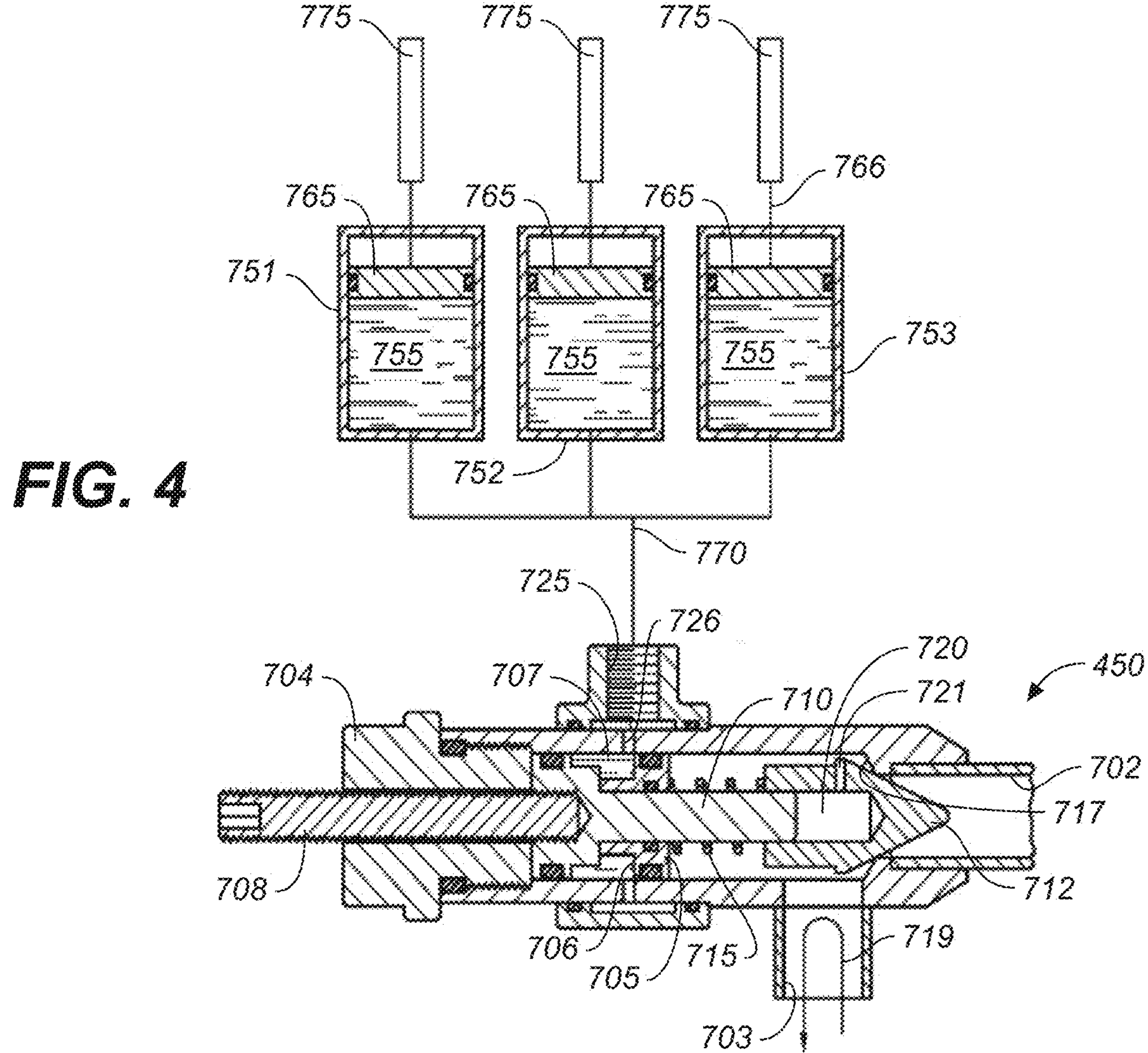
FIG. 4 is an enlarged section view showing an active valve and a plurality of valve operating cylinders in selective communication with an annular piston surface of the active valve, in accordance with an embodiment.

Referring now to FIG. 4, an enlarged view of an active valve 450 is shown in accordance with an embodiment. Although FIG. 4 shows the active valve 450 in a closed position (e.g. during a rebound stroke of the shock assembly), the following discussion also includes the opening of active valve 450. Active valve 450 includes a valve body 704 housing a movable piston 705 which is sealed within the body. The piston 705 includes a sealed chamber 707 adjacent an annularly-shaped piston surface 706 at a first end thereof. The chamber 707 and piston surface 706 are in fluid communication with a port 725 accessed via opening 726. Two additional fluid communication points are provided in the body including an inlet orifice 702 and an outlet orifice 703 for fluid passing through the active valve 450.

Extending from a first end of the piston 705 is a shaft 710 having a cone-shaped nipple 712 (other shapes such as spherical or flat, with corresponding seats, will also work suitably well) disposed on an end thereof. The nipple 712 is telescopically mounted relative to, and movable on, the shaft 710 and is biased toward an extended position due to a spring 715 coaxially mounted on the shaft 710 between the nipple 712 and the piston 705. Due to the spring biasing, the nipple 712 normally seats itself against a valve seat 717 formed in an interior of the valve body 704.

As shown, the nipple 712 is seated against valve seat 717 due to the force of the spring 715 and absent an opposite force from fluid entering the active valve 450 along inlet orifice 702. As nipple 712 telescopes out, a gap 720 is formed between the end of the shaft 710 and an interior of nipple 712. A vent 721 is provided to relieve any pressure formed in the gap. With a fluid path through the active valve 450 (from 703 to 702) closed, fluid communication is substantially shut off from the rebound side of the cylinder into the valve body (and hence to the compression side) and its "dead-end" path is shown by arrow 719.

In one embodiment, there is a manual pre-load adjustment on the spring 715 permitting a user to hand-load or un-load the spring using a threaded member 708 that transmits motion of the piston 705 towards and away from the conical member, thereby changing the compression on the spring 715.

Also shown in FIG. 4 is a plurality of valve operating cylinders 751, 752, 753. In one embodiment, the cylinders each include a predetermined volume of fluid 755 that is selectively movable in and out of each cylindrical body through the action of a separate piston 765 and rod 766 for each cylindrical body. A fluid path 770 runs between each cylinder and port 725 of the valve body where piston surface 706 is exposed to the fluid.

Because each cylinder has a specific volume of substantially incompressible fluid and because the volume of the sealed chamber 707 adjacent the piston surface 706 is known, the fluid contents of each cylinder can be used, individually, sequentially or simultaneously to move the piston a specific distance, thereby effecting the damping characteristics of the shock assembly in a relatively predetermined and precise way.

While the cylinders 751-753 can be operated in any fashion, in the embodiment shown each piston 765 and rod 766 is individually operated by a solenoid 775 and each solenoid, in turn, is operable from a remote location of the vehicle, like a cab of a motor vehicle or even the handlebar area of a motor or bicycle (not shown). Electrical power to the solenoids 775 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bottom out valve there is no issue involved in stepping from hydraulic system pressure to desired suspension bottom out operating pressure.

In one embodiment, e.g., when active valve 450 is in the damping-open position, fluid flow through inlet orifice 702 provides adequate force on the nipple 712 to urge it backwards, at least partially loading the spring 715 and creating a fluid flow path from the inlet orifice 702 into and through outlet orifice 703.

The characteristics of the spring 715 are typically chosen to permit active valve 450 (e.g. nipple 712) to open at a predetermined pressure, with a predetermined amount of control pressure applied to port 725. For a given spring 715, higher control pressure at port 725 will result in higher pressure required to open the active valve 450 and correspondingly higher damping resistance in inlet orifice 702. In one embodiment, the control pressure at port 725 is raised high enough to effectively "lock" the active valve closed resulting in a substantially rigid compression damper (particularly true when a solid damping piston is also used).

In one embodiment, the valve is open in both directions when the nipple 712 is "topped out" against valve body 704. In another embodiment however, when the piston 705 is abutted or "topped out" against valve body 704 the spring 715 and relative dimensions of the active valve 450 still allow for the nipple 712 to engage the valve seat 717 thereby closing the valve. In such embodiment backflow from the rebound side to the compression side is always substantially closed and cracking pressure from flow along inlet orifice 702 is determined by the pre-compression in the spring 715. In such embodiment, additional fluid pressure may be added to the inlet through port 725 to increase the cracking pressure for flow along inlet orifice 702 and thereby increase compression damping. It is generally noteworthy that while the descriptions herein often relate to compression damping and rebound shut off, some or all of the channels (or channel) on a given suspension unit may be configured to allow rebound damping and shut off or impede compression damping.

While the examples illustrated relate to manual operation and automated operation based upon specific parameters, in various embodiments, active valve 450 can be remotely-operated and can be used in a variety of ways with many different driving and road variables and/or utilized at any point during use of a vehicle. In one example, active valve 450 is controlled based upon vehicle speed in conjunction with the angular location of the vehicle's steering wheel. In this manner, by sensing the steering wheel turn severity (angle of rotation), additional damping (by adjusting the corresponding size of the opening of inlet orifice 702 by causing nipple 712 to open, close, or partially close inlet orifice 702) can be applied to one shock assembly or one set of vehicle shock assemblies on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active valve 450 (and corresponding change to the working size of the opening of inlet orifice 702 by causing nipple 712 to open, close, or partially close inlet orifice 702) in response thereto.

In another example, active valve 450 is controlled at least in part by a pressure transducer measuring pressure in a vehicle tire and adding damping characteristics to some or all of the wheels (by adjusting the working size of the opening of inlet orifice 702 by causing nipple 712 to open, close, or partially close inlet orifice 702) in the event of, for example, an increased or decreased pressure reading. In one embodiment, active valve 450 is controlled in response to braking pressure (as measured, for example, by a brake pedal (or lever) sensor or brake fluid pressure sensor or accelerometer).

In still another example, a parameter might include a gyroscopic mechanism that monitors vehicle trajectory and identifies a "spin-out" or other loss of control condition and adds and/or reduces damping to some or all of the vehicle's shock assemblies (by adjusting the working size of the opening of inlet orifice 702 by causing nipple 712 to open, close, or partially close inlet orifice 702 chambers) in the event of a loss of control to help the operator of the vehicle to regain control.

For example, active valve 450, when open, permits a first flow rate of the working fluid through inlet orifice 702. In contrast, when active valve 450 is partially closed, a second flow rate of the working fluid though inlet orifice 702 occurs. The second flow rate is less than the first flow rate but greater than no flow rate. When active valve 450 is completely closed, the flow rate of the working fluid though inlet orifice 702 is statistically zero.

In one embodiment, instead of (or in addition to) restricting the flow through inlet orifice 702, active valve 450 can vary a flow rate through an inlet or outlet passage within the active valve 450, itself. See, as an example, the electronic valve of FIGS. 2-4 of U.S. Pat. No. 9,353,818 which is incorporated by reference herein, in its entirety, as further example of different types of "electronic" or "active" valves). Thus, the active valve 450, can be used to meter the working fluid flow (e.g., control the rate of working fluid flow) with/or without adjusting the flow rate through inlet orifice 702.

Due to the active valve 450 arrangement, a relatively small solenoid (using relatively low amounts of power) can generate relatively large damping forces. Furthermore, when there is incompressible fluid inside the shock assembly, damping occurs as the distance between nipple 712 and inlet orifice 702 is reduced. The result is a controllable damping rate. Certain active valve features are described and shown in U.S. Pat. Nos. 9,120,362; 8,627,932; 8,857,580; 9,033,122; and 9,239,090 which are incorporated herein, in their entirety, by reference.

It should be appreciated that when the valve body 704 rotates in a reverse direction than that described above and herein, the nipple 712 moves away from inlet orifice 702 providing at least a partially opened fluid path.

Figure 5:
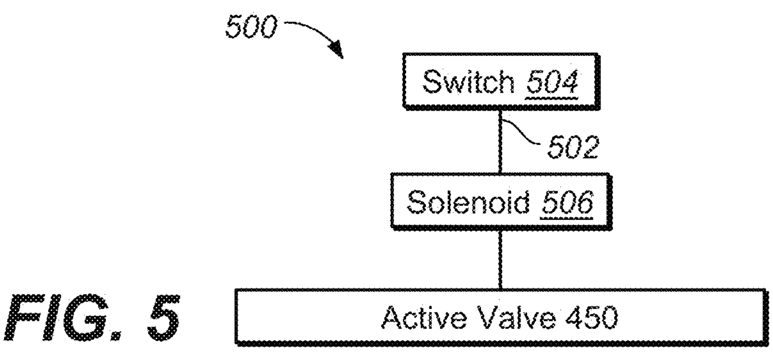
FIG. 5 is a schematic diagram showing a control arrangement for an active valve, in accordance with an embodiment.

FIG. 5 is a schematic diagram showing a control arrangement 500 for a remotely-operated active valve 450. As illustrated, a signal line 502 runs from a switch 504 to a solenoid 506. Thereafter, the solenoid 506 converts electrical energy into mechanical movement and rotates valve body 704 within active valve 450, In one embodiment, the rotation of valve body 704 causes an indexing ring consisting of two opposing, outwardly spring-biased balls to rotate among indentions formed on an inside diameter of a lock ring.

As the valve body 704 rotates, nipple 712 at an opposite end of the valve is advanced or withdrawn from an opening in inlet orifice 702. For example, the valve body 704 is rotationally engaged with the nipple 712. A male hex member extends from an end of the valve body 704 into a female hex profile bore formed in the nipple 712. Such engagement transmits rotation from the valve body 704 to the nipple 712 while allowing axial displacement of the nipple 712 relative to the valve body 704. Therefore, while the body does not axially move upon rotation, the threaded nipple 712 interacts with mating threads formed on an inside diameter of the bore to transmit axial motion, resulting from rotation and based on the pitch of the threads, of the nipple 712 towards or away from an inlet orifice 702, between a closed position, a partially open position, and a fully or completely open position.

Adjusting the opening of inlet orifice 702 modifies the flowrate of the fluid through active valve 450 thereby varying the stiffness of a corresponding shock assembly. While FIG. 5 is simplified and involves control of a single active valve 450, it will be understood that any number of active valves corresponding to any number of fluid channels (e.g., bypass channels, external reservoir channels, bottom out channels, etc.) for a corresponding number of vehicle suspension shock assemblies could be used alone or in combination. That is, one or more active valves could be operated simultaneously or separately depending upon needs in a vehicular suspension system.

For example, a suspension shock assembly could have one, a combination of, or each of an active valve(s): for a bottom out control, an internal bypass, for an external bypass, for a fluid conduit to the external reservoir, etc. In other words, anywhere there is a fluid flow path within a shock assembly, an active valve could be used. Moreover, the active valve could be alone or used in combination with other active valves at other fluid flow paths to automate one or more of the damping performance characteristics of the shock assembly. Moreover, additional switches could permit individual operation of separate active bottom out valves.

Figure 6:
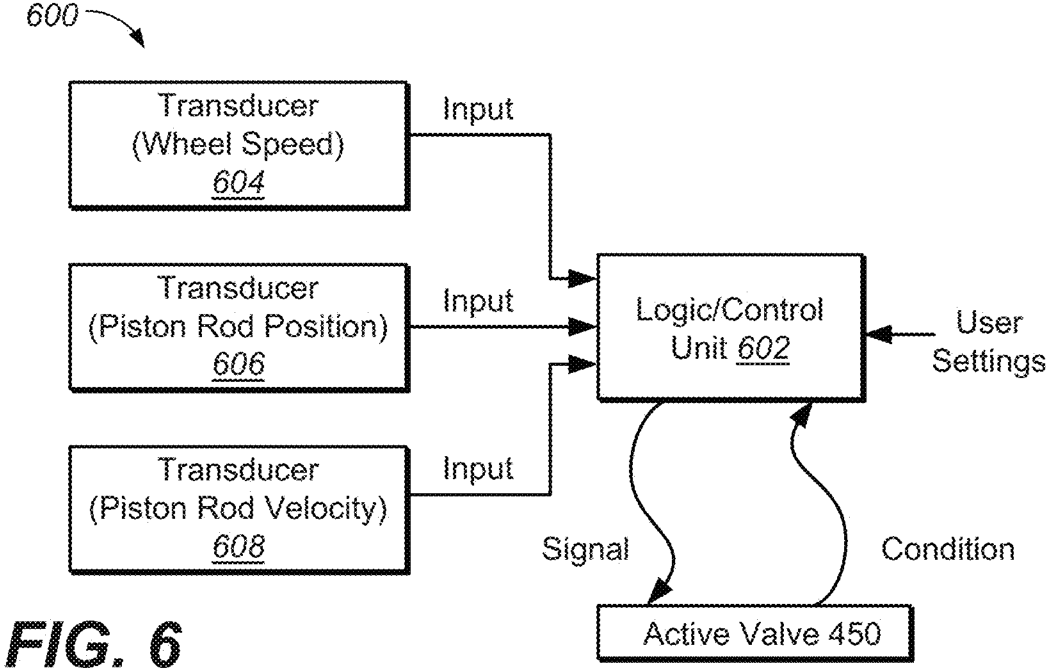
FIG. 6 is a schematic diagram of a control system based upon any or all of vehicle speed, damper rod speed, and damper rod position, in accordance with an embodiment.

In addition to, or in lieu of, the simple, switch-operated remote arrangement of FIG. 5, the remotely-operable active valve 450 can be operated automatically based upon one or more driving conditions, and/or automatically or manually utilized at any point during use of a vehicle. FIG. 6 shows a schematic diagram of a control system 600 based upon any or all of vehicle speed, damper rod speed, and damper rod position. One embodiment of the arrangement of FIG. 6 is designed to automatically increase damping in a shock assembly in the event a damper rod reaches a certain velocity in its travel towards the bottom end of the damping chamber of the shock assembly at a predetermined speed of the vehicle.

In one embodiment, the control system 600 adds damping (and control) in the event of rapid operation (e.g. high rod velocity) of the shock assembly to avoid a bottoming out of the damper rod as well as a loss of control that can accompany rapid compression of a shock assembly with a relative long amount of travel. In one embodiment, the control system 600 adds damping (e.g., adjusts the size of the opening of inlet orifice 702 by causing nipple 712 to open, close, or partially close inlet orifice 702) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 6 illustrates, for example, a control system 600 including three variables: wheel speed, corresponding to the speed of a vehicle component (measured by wheel speed transducer 604), piston rod position (measured by piston rod position transducer 606), and piston rod velocity (measured by piston rod velocity transducer 608). Any or all of the variables shown may be considered by logic unit 602 in controlling the solenoids or other motive sources coupled to active valve 450 for changing the working size of the opening of inlet orifice 702 by causing nipple 712 to open, close, or partially close inlet orifice 702. Any other suitable vehicle operation variable may be used in addition to or in lieu of the variables discussed herein, such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension shock assembly. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension shock assembly.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet.

A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension shock assembly measure piston rod velocity (e.g., via a piston rod velocity transducer 608), and piston rod position (e.g., via a piston rod position transducer 606), a separate wheel speed transducer 604 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 6, the logic unit 602 with user-definable settings receives inputs from piston rod position transducer 606, piston rod velocity transducer 608, as well as wheel speed transducer 604. Logic unit 602 is user-programmable and, depending on the needs of the operator, logic unit 602 records the variables and, then, if certain criteria are met, logic unit 602 sends its own signal to active valve 450 (e.g., the logic unit 602 is an activation signal provider) to cause active valve 450 to move into the desired state (e.g., adjust the flow rate by adjusting the distance between nipple 712 and inlet orifice 702). Thereafter, the condition, state or position of active valve 450 is relayed back to logic unit 602 via an active valve monitor or the like.

In one embodiment, logic unit 602 shown in FIG. 6 assumes a single active valve 450 corresponding to a single inlet orifice 702 of a single shock assembly, but logic unit 602 is usable with any number of active valves or groups of active valves corresponding to any number of orifices, or groups of orifices. For instance, the suspension shock assemblies on one side of the vehicle can be acted upon while the suspension shock assemblies on the other side remain unaffected. Similarly, the suspension shock assemblies at a front of the vehicle can be acted upon while the suspension shock assemblies at the rear of the vehicle remain unaffected. Further, suspension shock assemblies on one side of the vehicle and at the front or back of the vehicle can be acted upon while the suspension shock assemblies on the other side and at the other of the front or rear of the vehicle remain unaffected.

Figure 7:
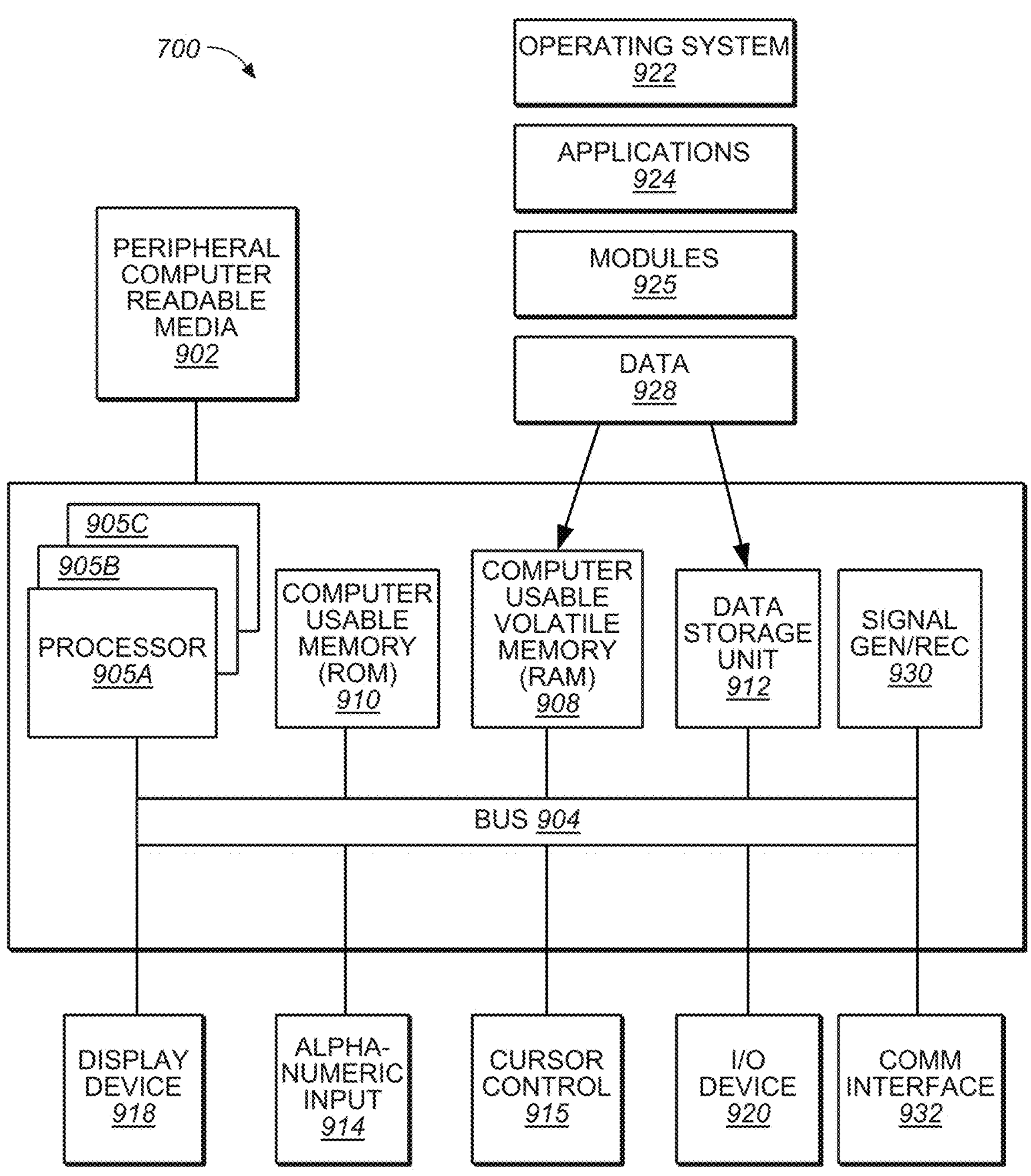
FIG. 7 is a block diagram of a computer system, in accordance with an embodiment.

With reference now to FIG. 7, a computer system 700 shown in accordance with one embodiment. In the following discussion, computer system 700 is representative of a computer system or components of a computer system that may be used with aspects of the present technology. For example, one or more components of integrated active valve assembly 78 may utilize one or more components disclosed in computer system 700. In one embodiment, different computing embodiments will only use some of the components shown in computer system 700.

For example, suspension controller module 35 can include some or all of the components of computer system 700. In different embodiments, suspension controller module 35 can include communication capabilities (e.g., wired such as ports or the like, and/or wirelessly such as near field communication, Bluetooth, WiFi, or the like) such that some of the components of computer system 700 are found on suspension controller module 35 while other components could be ancillary but communicatively coupled thereto (such as a mobile device, tablet, computer system or the like).

For example, in one embodiment, suspension controller module 35 can be communicatively coupled to one or more different computing systems to allow a user (or manufacturer, tuner, technician, etc.) to adjust or modify any or all of the programming stored in suspension controller module 35. In one embodiment, the programming includes computer-readable and computer-executable instructions that reside, for example, in non-transitory computer-readable medium (or storage media, etc.) of suspension controller module 35 and/or computer system 700.

In one embodiment, computer system 700 includes an address/data/control bus 904 for communicating information, and a processor 905A coupled to bus 904 for processing information and instructions. As depicted in FIG. 7, computer system 700 is also well suited to a multi-processor environment in which a plurality of processors 905A, 905B, and 905C are present. Conversely, computer system 700 is also well suited to having a single processor such as, for example, processor 905A. Processors 905A, 905B, and

905C may be any of various types of microprocessors. Computer system 700 also includes data storage features such as a computer usable volatile memory 908, e.g., random access memory (RAM), coupled to bus 904 for storing information and instructions for processors 905A, 905B, and 905C.

Computer system 700 also includes computer usable non-volatile memory 910, e.g., read only memory (ROM), coupled to bus 904 for storing static information and instructions for processors 905A, 905B, and 905C. Also present in computer system 700 is a data storage unit 912 (e.g., a magnetic disk drive, optical disk drive, solid state drive (SSD), and the like) coupled to bus 904 for storing information and instructions. Computer system 700 also can optionally include an alpha-numeric input device 914 including alphanumeric and function keys coupled to bus 904 for communicating information and command selections to processor 905A or processors 905A, 905B, and 905C. Computer system 700 also can optionally include a cursor control device 915 coupled to bus 904 for communicating user input information and command selections to processor 905A or processors 905A, 905B, and 905C. Cursor control device may be a touch sensor, gesture recognition device, and the like. Computer system 700 of the present embodiment can optionally include a display device 918 coupled to bus 904 for displaying information.

Referring still to FIG. 7, display device 918 of FIG. 7 may be a liquid crystal device, cathode ray tube, OLED, plasma display device or other display device suitable for creating graphic images and alpha-numeric characters recognizable to a user. Cursor control device 915 allows the computer user to dynamically signal the movement of a visible symbol (cursor) on a display screen of display device 918. Many implementations of cursor control device 915 are known in the art including a trackball, mouse, touch pad, joystick, non-contact input, gesture recognition, voice commands, bio recognition, and the like. In addition, special keys on alpha-numeric input device 914 capable of signaling movement of a given direction or manner of displacement. Alternatively, it will be appreciated that a cursor can be directed and/or activated via input from alpha-numeric input device 914 using special keys and key sequence commands.

Computer system 700 is also well suited to having a cursor directed by other means such as, for example, voice commands. Computer system 700 also includes an I/O device 920 for coupling computer system 700 with external entities. For example, in one embodiment, I/O device 920 is a modem for enabling wired or wireless communications between computer system 700 and an external network such as, but not limited to, the Internet or intranet. A more detailed discussion of the present technology is found below.

Referring still to FIG. 7, various other components are depicted for computer system 700. Specifically, when present, an operating system 922, applications 924, modules 925, and data 928 are shown as typically residing in one or some combination of computer usable volatile memory 908, e.g., random-access memory (RAM), and data storage unit 912. However, it is appreciated that in some embodiments, operating system 922 may be stored in other locations such as on a network or on a flash drive; and that further, operating system 922 may be accessed from a remote location via, for example, a coupling to the Internet. The present technology may be applied to one or more elements of computer system 700.

Computer system 700 also includes one or more signal generating and receiving device(s) 930 coupled with bus 904 for enabling computer system 700 to interface with other electronic devices and computer systems. Signal generating and receiving device(s) 930 of the present embodiment may include wired serial adaptors, modems, and network adaptors, wireless modems, and wireless network adaptors, and other such communication technology. The signal generating and receiving device(s) 930 may work in conjunction with one (or more) communication interface 932 for coupling information to and/or from computer system 700. Communication interface 932 may include a serial port, parallel port, Universal Serial Bus (USB), Ethernet port, Bluetooth, thunderbolt, near field communications port, WiFi, Cellular modem, or other input/output interface. Communication interface 932 may physically, electrically, optically, or wirelessly (e.g., via radio frequency) be used to communicatively couple computer system 700 with another device, such as a mobile phone, radio, or computer system.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. An integrated active valve assembly comprising:

a suspension controller module, wherein the suspension controller module comprises:

a housing;

a suspension controller;

a battery; and at least one sensor;

an active shock assembly, said active shock assembly configured to automatically adjust its operation and a corresponding damping characteristic based upon operational information pertaining to a vehicle to which said active shock assembly is coupled, wherein said active shock assembly comprises:

at least one active valve; and wherein said suspension controller module can automatically and without requiring user intervention send a signal to modify said damping characteristic of said active shock assembly during use of said vehicle, wherein said suspension controller module is a self-contained module in which said housing is integrated with said suspension controller, said battery, and said at least one sensor, wherein said suspension controller module does not require any external sensors or power source for said suspension controller module to perform the functions of said integrated active valve assembly, such that a stand-alone active valve control shock assembly is provided, wherein said stand-alone active valve control shock assembly does not require any wired connection to any component outside of said housing, said suspension controller module and said active shock assembly configured to be mounted to a suspension of said vehicle such that a relative position of said suspension controller module and said active shock assembly with respect to each other remains unchanged when said suspension is compressed.

2. The integrated active valve assembly of claim 1, further comprising:

said suspension controller module mounted to an unsprung mass of a vehicle.

3. The integrated active valve assembly of claim 1, further comprising:

said suspension controller module to communicate at least one adjustment input to said at least one active valve, said at least one adjustment input to adjust said at least one active valve and modify said damping characteristic of said active shock assembly.

4. The integrated active valve assembly of claim 1, further comprising:

said suspension controller module mounted to an unsprung mass of a bicycle.

5. The integrated active valve assembly of claim 4, further comprising:

a front fork assembly of said bicycle, said front fork assembly comprising:

at least one fork leg, said at least one fork leg comprising:

an upper fork tube; and a lower fork tube telescopically coupled with said upper fork tube, said lower fork tube being unsprung;

said active shock assembly within an interior of said at least one fork leg; and said suspension controller module mounted to an exterior of said lower fork tube.

6. An integrated active valve assembly comprising:

a suspension controller module, the suspension controller module comprising:

a housing;

a controller;

a battery; and at least one sensor;

an active shock assembly, said active shock assembly configured to automatically adjust its operation and a corresponding damping characteristic based upon operational information pertaining to a vehicle to which said active shock assembly is coupled, wherein said active shock assembly comprises:

at least one active valve; and wherein said suspension controller module can automatically and without requiring user intervention send a signal to said active shock assembly, said signal to modify said damping characteristic of said active shock assembly during use of said vehicle, wherein said suspension controller module is a self-contained module in which said housing is integrated with said suspension controller module, said battery, and said at least one sensor, wherein said suspension controller module does not require any external sensors or power source for said suspension controller module to perform the functions of said integrated active valve assembly, such that a stand-alone active valve control shock assembly is provided, wherein said stand-alone active valve control shock assembly does not require any wired connection to any component outside of said housing, said suspension controller module and said active shock assembly configured to be mounted to a suspension of said vehicle such that a relative position of said suspension controller module and said active shock assembly with respect to each other remains unchanged when said suspension is compressed.

7. The integrated active valve assembly of claim 6, further comprising:

said suspension controller module to communicate at least one adjustment input to said at least one active valve, said at least one adjustment input to cause said at least one active valve and modify said damping characteristic of said active shock assembly.

8. The integrated active valve assembly of claim 6, further comprising:

said suspension controller module mounted to an unsprung mass of a bicycle.

9. The integrated active valve assembly of claim 8, further comprising:

a front fork assembly of said bicycle, said front fork assembly comprising:

at least one fork leg, said at least one fork leg comprising:

an upper fork tube; and a lower fork tube telescopically coupled with said upper fork tube, said lower fork tube being unsprung;

said active shock assembly within an interior of said at least one fork leg; and said suspension controller module mounted to an exterior of said lower fork tube.

10. An integrated active valve assembly comprising:

a self-contained suspension controller module comprising:

a housing;

a controller;

a battery; and one or more sensors;

an active shock assembly comprising at least one active valve, said active shock assembly configured to automatically adjust its operation and a corresponding damping characteristic based upon operational information pertaining to a vehicle to which said active shock assembly is coupled; and wherein said self-contained suspension controller module can automatically and without requiring user intervention communicate an adjustment input to said at least one active valve, said adjustment input to modify said damping characteristic of said active shock assembly during use of said vehicle, wherein said self-contained suspension controller module is a self-contained module in which said housing is integrated with said self-contained suspension controller, said battery, and said one or more sensors, wherein said self-contained suspension controller module does not require any external sensors or power source for said self-contained suspension controller module to perform the functions of said integrated active valve assembly, such that a stand-alone active valve control shock assembly is provided, wherein said stand-alone active valve control shock assembly does not require any wired connection to any component outside of said housing, said suspension controller module and said active shock assembly configured to be mounted to a suspension of said vehicle such that a relative position of said suspension controller module and said active shock assembly with respect to each other remains unchanged when said suspension is compressed.

11. The integrated active valve assembly of claim 10, further comprising:

said self-contained suspension controller module mounted to an unsprung mass of a vehicle.

12. The integrated active valve assembly of claim 11, further comprising:

a front fork assembly of a bicycle, said front fork assembly comprising:

at least one fork leg, said at least one fork leg comprising:

an upper fork tube; and a lower fork tube telescopically coupled with said upper fork tube, said lower fork tube being said unsprung mass;

said active shock assembly within an interior of said at least one fork leg; and said self-contained suspension controller module mounted to an exterior of said lower fork tube.

13. The integrated active valve assembly of claim 11, further comprising:

said self-contained suspension controller module mounted to a bicycle.

14. The integrated active valve assembly of claim 13, further comprising:

said active shock assembly is a rear shock assembly positioned between a main frame and a swing arm of said bicycle; and said self-contained suspension controller module mounted to an exterior of said rear shock assembly.

* * * * *